US012705329B2

(12) United States Patent
Woo

(10) Patent No.: US 12,705,329 B2
(45) Date of Patent: Aug. 11, 2026

(54) MANAGING METHOD FOR USE OF AN APPLICATION BASED ON AUTHENTICATED BIOMETRIC INFORMATION ON A SMARTPHONE

(71) Applicant: ESTORM CO., LTD., Seoul (KR)

(72) Inventor: Jong Hyun Woo, Seoul (KR)

(73) Assignee: ESTORM CO., LTD., Seoul (KR)

( * ) Notice: Subject to any disclaimer, the term of this patent is extended or adjusted under 35 U.S.C. 154(b) by 449 days.

(21) Appl. No.: 18/012,243

(22) PCT Filed: Feb. 3, 2022

(86) PCT No.: PCT/KR2022/001713

§ 371 (c)(1),
(2) Date: Dec. 22, 2022

(87) PCT Pub. No.: WO2022/169273

PCT Pub. Date: Aug. 11, 2022

(65) Prior Publication Data

US 2023/0342447 A1 Oct. 26, 2023

(30) Foreign Application Priority Data

Feb. 5, 2021 (KR) ........................ 10-2021-0016763

(51) Int. Cl.
*G06F 7/04* (2006.01)
*G06F 21/32* (2013.01)
*G06F 21/44* (2013.01)

(52) U.S. Cl.
CPC .............. *G06F 21/44* (2013.01); *G06F 21/32* (2013.01)

(58) Field of Classification Search
CPC .......... G06F 21/31; G06F 21/32; G06F 21/33; G06F 21/44; H04L 9/321; H04L 9/3263; H04L 63/0823; H04L 63/0861
See application file for complete search history.

(56) References Cited

U.S. PATENT DOCUMENTS 6,256,737 B1 * 7/2001 Bianco ..................... G07C 9/37 713/186
11,296,893 B2 * 4/2022 Flokos ................ H04L 63/0823
(Continued)

FOREIGN PATENT DOCUMENTS

KR 10-2012-0119210 A 10/2012
KR 10-2015-0090557 A 8/2015
(Continued)

OTHER PUBLICATIONS

Kim et al, Study of Certificates Management by Mobile Device with Bluetooth, Dec. 2, 2010, IEEE, pp. 1064-1067. (Year: 2010).*
(Continued)

*Primary Examiner* — Philip J Chea
*Assistant Examiner* — Jenise E Jackson
(74) *Attorney, Agent, or Firm* — PnK IP LLC

(57) ABSTRACT

The present invention relates to an electronic certificate managing method based on biometrics information, and more particularly to a method whereby a relevant electronic certificate can be used only when biometrics information (e.g., biometrics template) checked and generated by an issuing agency at the time of issuance of the electronic certificate and biometrics information obtained at the time of use of the relevant electronic certificate are mutually matched.

8 Claims, 3 Drawing Sheets

(56) References Cited

U.S. PATENT DOCUMENTS

2001/0017584 A1* 8/2001 Shinzaki ............. G06F 21/6245 340/5.6
2001/0034836 A1* 10/2001 Matsumoto ........... H04L 9/3231 713/176
2003/0115473 A1* 6/2003 Sugimura ............... G06F 21/32 713/186
2004/0010698 A1* 1/2004 Rolfe .................... H04L 9/3231 713/186
2006/0041507 A1* 2/2006 Novack ................... G06F 21/31 705/50
2008/0065901 A1* 3/2008 Takaku ................... G06F 21/34 713/186
2014/0025520 A1* 1/2014 Mardikar ............. G06Q 20/204 705/44
2014/0115324 A1 4/2014 Buer
2014/0379584 A1* 12/2014 Ward ................. G06Q 20/3829 705/71
2015/0121514 A1* 4/2015 Park ..................... A61B 5/1172 726/19
2016/0125415 A1* 5/2016 Mardikar ......... G06Q 20/40145 705/44
2016/0241405 A1 8/2016 Jeong et al.
2018/0253539 A1* 9/2018 Minter .................... G06F 21/64
2018/0295129 A1* 10/2018 Kohli ...................... G06F 21/33
2020/0143025 A1* 5/2020 Giri ......................... G06F 21/32
2021/0014051 A1* 1/2021 Akoob .................. H04L 9/0825
2021/0089635 A1* 3/2021 Weeresinghe ... G06Q 20/40145
2022/0116231 A1* 4/2022 Choi ..................... H04L 9/3247

FOREIGN PATENT DOCUMENTS

KR 10-2016-0099922 A 8/2016
KR 10-2016-0139885 A 12/2016

OTHER PUBLICATIONS

Black et al, Be Careful Who You Trust: Issues with Public Key Infrastructure, Nov. 25, 2014, IEEE, pp. 12-21. (Year: 2014).*

International Search Report for PCT/KR2022/001713 mailed May 26, 2022 from Korean Intellectual Property Office.

* cited by examiner

【FIG. 1】
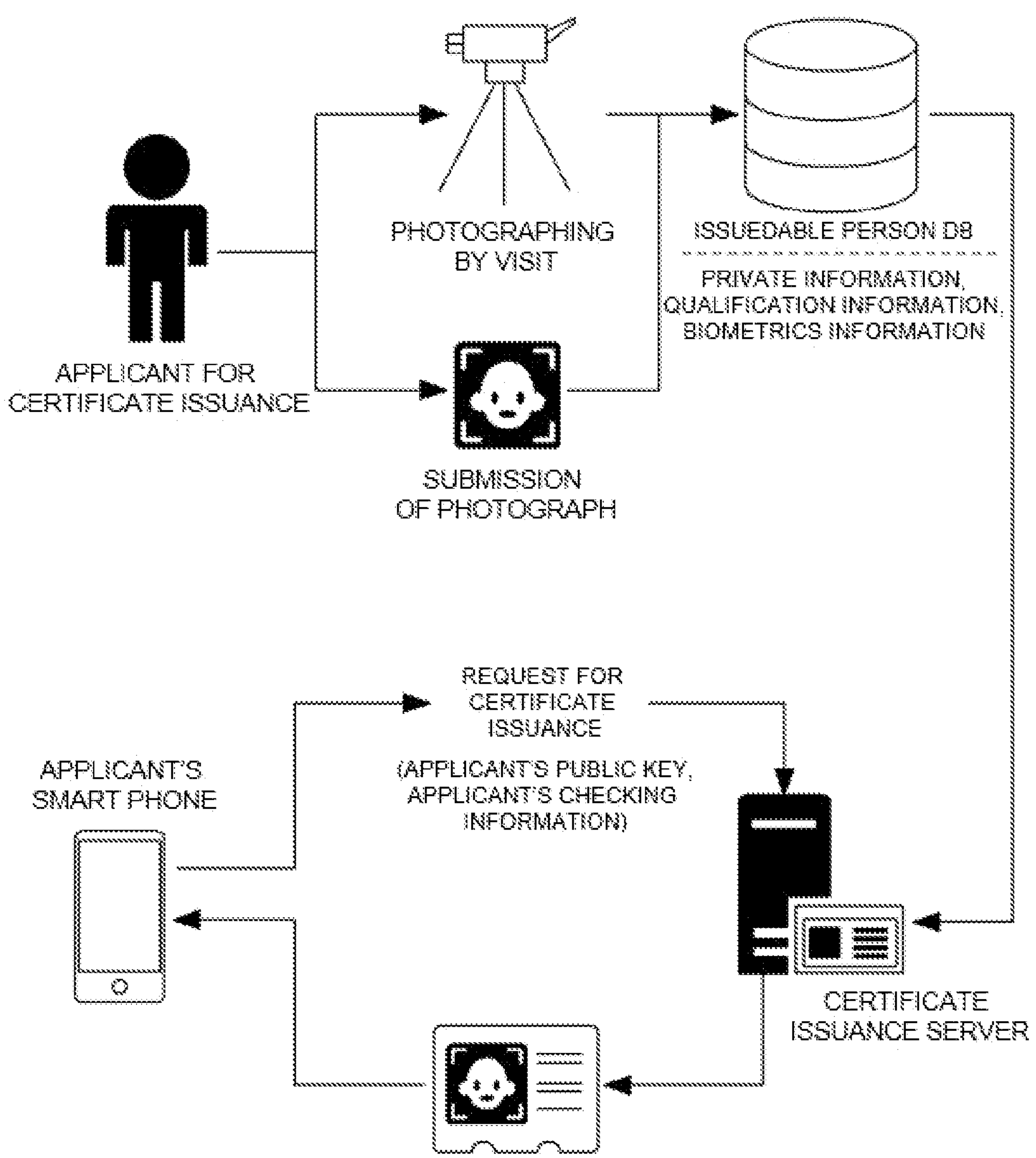

【FIG. 2】
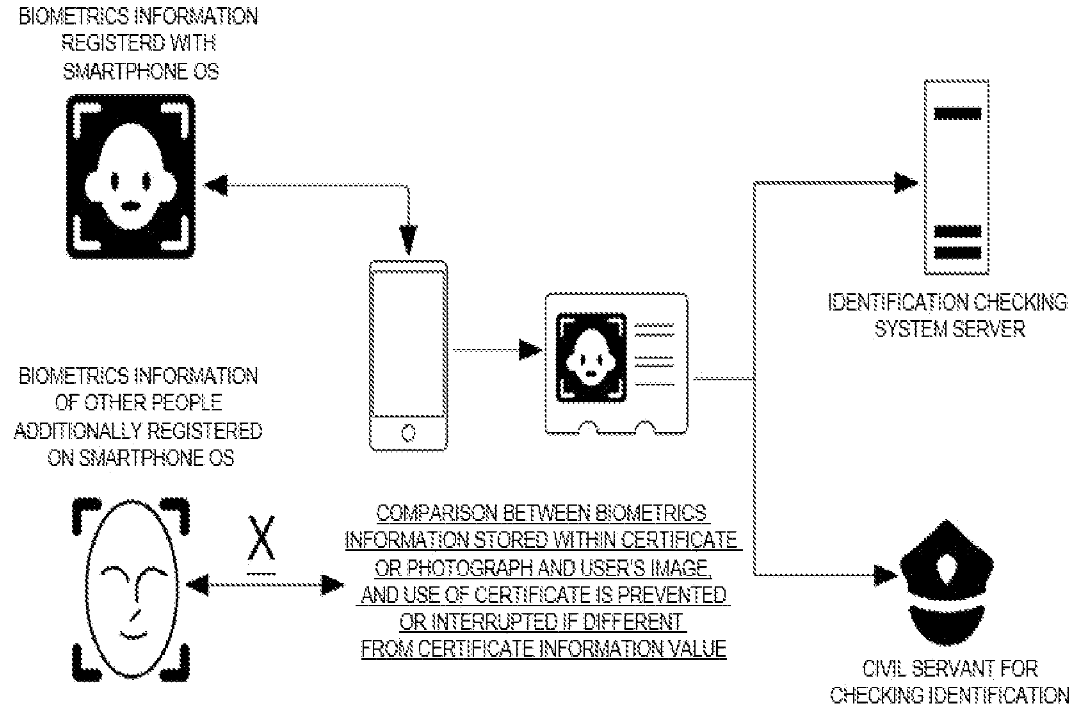

【FIG. 3】
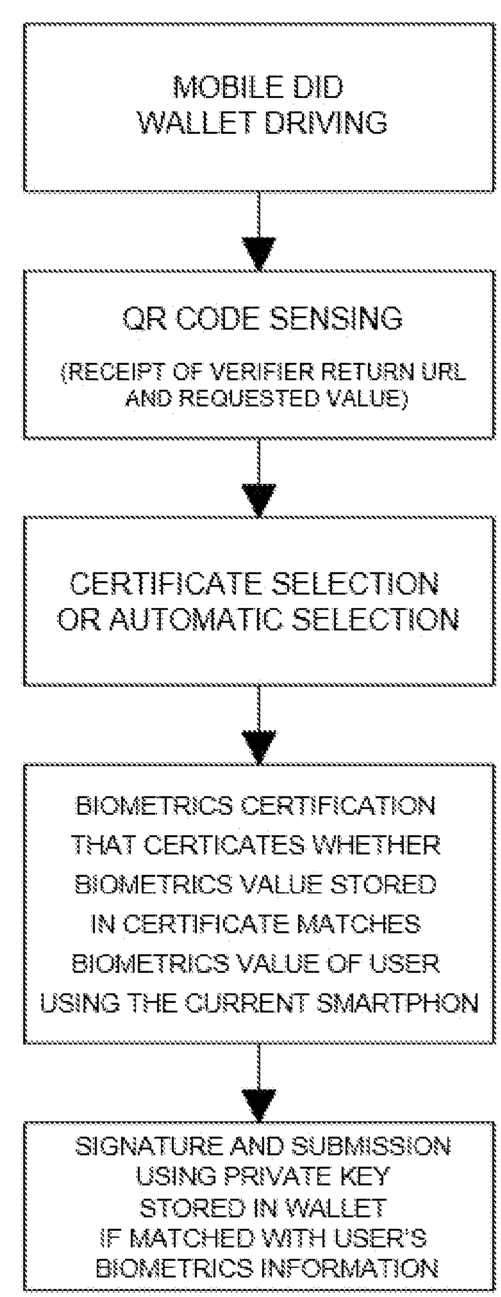

MANAGING METHOD FOR USE OF AN APPLICATION BASED ON AUTHENTICATED BIOMETRIC INFORMATION ON A SMARTPHONE

TECHNICAL FIELD

The teachings in accordance with exemplary and non-limiting embodiments of this invention generally relate to an electronic certificate managing method based on biometrics information, and more particularly to a method whereby a relevant electronic certificate can be used only when biometrics information (e.g., biometrics template) checked and generated by an issuing agency at the time of issuance of the electronic certificate and biometrics information obtained at the time of use of the relevant electronic certificate are mutually matched.

BACKGROUND ART OF THE INVENTION

Recently, uses of electronic certificates have been greatly increased for identifications or credentials of users under online/mobile environments and offline contact/noncontact environments as well.

Conventionally, an electronic certificate is issued to a smart phone or a Personal Computer of a 'relevant person or a person to be issued with the electronic certificate' (hereinafter simply referred as an 'issuedable person') after identification of the issuedable person has been ascertained or a particular qualification has been certified by a third issuing agency.

The issuing process of the electronic certificates will be explained in detail in the following manner. That is, when an electronic certificate is issued by an issuing agency, a private key of the issuing agency will electronically sign the certificate information to be contained in the electronic certificate including, but not limited to, a public key submitted by the issuedable person, private information of issuedable person (identity information including name, gender, birth date and the like) and qualification information (driver's license, final education history, military history and the like), and the issuing agency will issue (generate) the electronic certificate including the said electronic signature value along with the relevant certificate information, and transmit the same to a smart phone or a PC of the issuedable person.

The person having received the electronic certificate, when the person is required to submit a certificate or to sign an electronic signature, may sign a requested value of submission agency (contents including login challenge value, transaction details and the like to be checked by the submission agency) using the private key corresponding to a public key submitted to the issuing agency at the time of issuance of the certificate, and submit the same along with the electronic certificate. In this case, the submission agency may certify the signature of a signer using the public key stored in a relevant electronic certificate, and then, check the effectiveness of data within the electronic certificate issued by the relevant issuing agency using the public key of the issuing agency that has issued the relevant electronic certificate.

However, the problem of verification technique using the conventional electronic certificate lies not in whether a person who has received the certificate actually uses a relevant electronic certificate but in impossibility in ascertaining whether a person who has stolen the certificate uses the relevant electronic certificate. An exemplary case thereto may include a mobile driver's license App or a DID-based identification App, where, when a smart phone normally issued with an electronic certificate is additionally registered with a biometrics authentication value of the other person, a relevant App is driven, and then the just-registered biometrics authentication value is provided to the smart phone, even the other person who is not a real user of the relevant smart phone can steal the previously-issued identification or qualification of the real user.

DETAILED DESCRIPTION OF THE INVENTION

Technical Subject

The present invention is derived to solve the aforementioned problems and it is an object of the present invention to provide a method whereby, when a previously-issued electronic certificate is to be used, the relevant electronic certificate can be used only when biometrics information checked and generated by an issuing agency at the time of issuance of the electronic certificate and biometrics information obtained at the time of use of the relevant electronic certificate are mutually matched.

Technical Solution

In one general aspect of the present invention, there may be provided an electronic certificate managing method implemented by a certificate management application program installed on an electronic communication device of a user. At this time, the certificate management application program may allow using the electronic certificate only when it is confirmed that first biometrics authentication information registered at the time of issuance of the electronic certificate and second biometrics authentication information obtained at the time of use of the electronic certificate are mutually matched, when there is a use request of the electronic certificate previously issued by an issuing agency and stored in the electronic communication device.

Advantageous Effects

The teachings of the electronic certificate managing method based on biometrics information in accordance with the exemplary embodiments of the present invention may have an advantageous effect of confirming that a person submitting an electronic certificate is the same person as the true legitimate identity submitter by allowing certificate management software or a wallet to be operated so that only a legitimate person can use the relevant electronic certificate by mutually comparing biometrics information (e.g., biometrics template) checked and generated by an issuing agency at the time of issuance of the electronic certificate with biometrics information obtained at the time of use of the relevant electronic certificate.

BRIEF DESCRIPTION OF DRAWINGS

FIG. 1 is a schematic view for explaining an electronic certificate issuing process based on biometrics information according to an exemplary embodiment of the present invention.

FIG. 2 is a schematic view for explaining an electronic certificate managing method through a biometrics information certificate managing wallet according to an exemplary embodiment of the present invention.

FIG. 3 is a flowchart for illustrating a driving flow of through a biometrics information certificate managing wallet according to an exemplary embodiment of the present invention.

SUMMARY OF THE INVENTION

The present invention may be embodied in many different modifications and alterations and have several exemplary embodiments, where specific exemplary embodiments will be exemplified through drawings which are to be described in details in the detailed descriptions. However, it should be appreciated that the present invention is not intended to be limited to particular exemplary embodiments but to encompass all equivalent alterations and/or modifications within the scope and spirit of the present invention.

In describing the present invention, detailed descriptions of constructions or processes known in the art may be omitted to avoid obscuring appreciation of the invention with unnecessary detail regarding such known constructions and functions. Furthermore, although the numerical terms (e.g., first, second, etc.) may be used herein to describe various elements, these elements should not be limited by these terms. These terms are simply identification symbols to distinguish one element from another element.

Furthermore, throughout the specification, it will be understood that when an element is referred to as being "connected" or "coupled" to another element, it can be directly connected or coupled to the other element or intervening elements may be present unless specified otherwise. Furthermore, throughout the specification, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and operation and can be implemented by hardware components or software components and combinations thereof.

The 'electronic certificate' in the present invention may be defined as a concept including all types of electronic certificates used for identifications or credentials of a particular user (or a particular user group, organization) including, but not limited to, accredited certificates, joint certificates, private certificates, mobile IDs, mobile licenses, mobile passports, mobile vaccine passes, VCs {(Verifiable Credentials) in the technologies of DID (Decentralized Identification)}.

According to exemplary embodiments of the present invention, an electronic certificate managing method implemented by certificate management application programs installed on an electronic communication device of a user may be provided.

Now, exemplary embodiments of the present invention will be described in detail with reference to the accompanying drawings. Here, FIG. 1 is a schematic view for explaining an electronic certificate issuing process based on biometrics information according to an exemplary embodiment of the present invention, FIG. 2 is a schematic view for explaining an electronic certificate managing method through a biometrics information certificate managing wallet according to an exemplary embodiment of the present invention, and FIG. 3 is a flowchart for illustrating a driving flow of through a biometrics information certificate managing wallet according to an exemplary embodiment of the present invention.

For convenience of illustration in the attached drawings and concentration of explanation of the present invention, emphasis may be centered on explanations that the electronic communication device of a user is a smart phone and the certificate management application program is a blockchain DID-based mobile wallet ('biometrics information certificate management wallet' in the explanation of the drawings, hereinafter the term will be unified as such). However, the electronic communication devices of the user may be so variable as to include PCs, notebooks, tablet PCs and the like, and even the certificate management application program may not be limited to the DID certificate management program at all times, as long as the program is equipped with an electronic certificate use management function hereinafter to be explained, and therefore any type of application programs including the PKI-based electronic certificate management program and the like may be acceptable.

An exemplary embodiment of the present invention may be characterized in that the biometrics information certificate management wallet, when there is a use request on the electronic certificate stored in the electronic communication device by being previously issued by an issuing agency, permits the use of the electronic certificate only when it is confirmed that first biometrics authentication information registered at the time of issuance of the electronic certificate and second biometrics authentication information obtained at the time of use of the electronic certificate are mutually matched.

That is, when a user uses a particular electronic certificate from a certificate management App of smart phone or a wallet App stored with the electronic certificate previously issued by an issuing agency in an exemplary embodiment of the present invention, stealing by other person of a relevant electronic certificate can be effectively prevented by allowing the relevant electronic certificate to be displayed through a relevant App screen with reference to a selected certificate, or the relevant electronic certificate to be submitted to a predetermined submitter by signing using a private key stored within the smart phone (that is, by confirming, by a certificate management wallet, whether a user desired to use the relevant electronic certificate is the same person as the issuedable person of the relevant electronic certificate), only when a biometrics authentication value registered at the time of issuance of the electronic certificate with reference to the selected certificate matches to biometrics authentication value inputted and generated through a camera or a microphone of a smart phone at the time of use of the relevant electronic certificate.

At this time, the first biometrics authentication information may be biometrics template information generated by the issuing agency based on the biometrics information submitted to the issuing agency by the issuedable person that has requested the issuance of the electronic certificate (see FIG. 1).

The first biometrics authentication information may be information captured/photographed by personally visiting the issuing agency, information by submitting a photograph, or biometrics information template generated based on biometrics information directly photographed or uploaded from his or her own smart phone or a PC.

The biometrics information template, depending on implementing methods, may be issued by signature using a public key of issuing agency by being included with the electronic certificate, issued by being included with other corresponding electronic certificates while not being included in the electronic certificate, or directly issued onto a wallet using other corresponding formats while not being included in the electronic certificate.

Furthermore, the second biometrics authentication information may be biometrics template information generated by the biometrics information certificate management wallet based on the biometrics information of a user obtained in real time by a biometrics recognition sensor of the electronic communication device in time for use point of the electronic certificate (see FIG. 2).

The first biometrics authentication information and the second biometrics authentication information may be generated by the same biometrics template generation algorithm (e.g., by using the same biometrics pattern generator).

The first biometrics authentication information according to an exemplary embodiment of the present invention may be stored by being mounted within the electronic certificate, stored by being mounted within other certificates corresponding to the electronic certificate, stored in the biometrics information certificate management wallet, or stored in a security storage area within an electronic communication device accessible by the biometrics information certificate management wallet. For convenience and concentration of explanations for the present invention, explanations will be given on an assumption that the first biometrics authentication information is mounted within the electronic certificate.

In this case, a comparison (or contrast) on whether there is a consistent match between the first biometrics authentication information and the second biometrics authentication information may be implemented by the biometrics information certificate management wallet.

In another exemplary embodiment, the first biometrics authentication information may be stored in a server of the issuing agency. In this case, the biometrics information certificate management wallet may allow the comparison on whether there is a consistent match between the first biometrics authentication information and the second biometrics authentication information to be implemented by the server of the issuing agency through transmission, to the server of the issuing agency, of the biometrics template information generated based on biometrics information obtained in real time in time for the use point of the electronic certificate, and may receive a comparison result on the consistent or inconsistent match from the server of the issuing agency. The biometrics information certificate management wallet may determine whether to permit or not to permit the use of the electronic certificate by a relevant user in response to receipt of then comparison result.

Furthermore, the aforementioned comparison on the match or mismatch between the first biometrics authentication information and the second biometrics authentication information may be implemented in time for an initially driven driving timing of the certificate management application, or may be implemented in time for a selection timing of the electronic certificate by a relevant user (see FIG. 3).

The conventional and general technical method of ascertaining a mobile ID submitter in a face-to-face circumstance was to transmit an electronic certificate of a submitter to a reader of a certifier using a wireless communication method, or to allow a certifier to ascertain using a reader by transmission to a large-capacity second dimensional bar code. However, in the above case, the comparative ascertainment can be visually implemented only with naked eye on whether a person submitting an ID is the very right person himself or herself, and, as a result, no ascertainment is provided by the submitter to the extent on whether the biometrics information of the ID matches the person using the biometrics information at the time of use of the ID.

Furthermore, according to the conventional technique, there was no way or method to be able to check whether a person who submitted an electronic certificate even under an online situation is the same person who received the certificate. In other words, the current method (i.e., conventional method) is such that a previously-issued electronic certificate can be easily stolen by a third party if a biometrics value of a third party is additionally registered on a mobile device issued with an electronic certificate or a biometrics authenticator of a PC operating system to thereafter match only to biometrics authentication of the operating system, or if the third party finds out the password inputted at the time of issuance.

Meantime, according to the present invention, the theft of ID/certificate by a third party (other people) can be prevented by allowing the certificate management software or wallet to be operated, where the relevant certificate can be used only by a user when the biometrics authentication value stored in the electronic certificate is matched to a biometrics authentication value obtained in real time by a mobile terminal As a result, even when a terminal of a third party is stored with an electronic certificate of the user, the relevant certificate cannot be used if not himself or herself. Furthermore, because the operation (driving) is independently controlled and managed for each certificate, and in case of a particular certificate (group certificate or agency certificate instead of individual) when useable persons are allocated to several persons, authentication is made to be possible even of one of the persons is matched.

Furthermore, according to the conventional technique, when the biometrics information is mounted on the electronic certificate, a holder must submit a certificate contained with his or her own biometrics information to a verifier, whereby there is a risk of his or her own biometrics pattern being exposed to anybody or anywhere.

Therefore, according to another exemplary embodiment of the present invention, a server (i.e., issuer server in case of DID based certificate issuance) of the issuing agency may issue an additional separate biometrics certificate mounted with the first biometrics authentication information of the issuing agency in the course of issuing process of the electronic certificate, and transmit the electronic certificate and the biometrics certificate to the biometrics information certificate management wallet. At this time, the biometrics information certificate management wallet may determine whether to permit or not to permit the use of the electronic certificate by comparing the first biometrics authentication information mounted on the biometrics certificate with the second biometrics authentication information if they are matched.

Furthermore, when the issued certificate and the wallet support a selective publication, and when one electronic certificate is mounted with the biometrics authentication information and distributed, and the user submits the certificate previously issued by the wallet, the certificate may be submitted to the verifier except for his or her own biometrics authentication information if the biometrics information at the time of issuance and the biometrics information of current user are matched.

Furthermore, when the issuing agency distributes to the user's terminal by mounting a possessor's photograph, without including a separate biometrics template within the electronic certificate or the electronic ID, the first biometrics authentication information may be generated by extracting a biometrics characteristic point from the photograph distributed from the terminal at the very moment when the user uses the relevant electronic certificate or an electronic ID, and may be compared, if matched, with the biometrics value (the second biometrics authentication information) of the user obtained in real time from the user's terminal, whereby the certificate management software or wallet is made to be operated so that the relevant certificate/ID can be used only by a matched user.

Although the present invention has been explained so far with reference to the exemplary embodiments, it will be easily understood that various changes and modifications might be made by those skilled in the art without departing from the scope and idea of the invention as expressed in the following claims.

The invention claimed is:

1. A managing method for use of a certificate management application program installed on a smartphone of a user, wherein:

when there is a use request of the electronic certificate previously issued by an issuing agency and stored in the smartphone of the user, the certificate management application program allows using the electronic certificate only when it is confirmed that first picture information registered at the time of issuance of the electronic certificate signed by a private key of the issuing agency and stored with the electronic certificate, and second picture information obtained by the smartphone of the user at the time of use of the electronic certificate are mutually matched;

the first picture information is stored within the certificate management application program and the second picture information is an information generated by the certificate management application program based on the picture of the user obtained in real time by a camera of the smartphone of the user in time for use point of the electronic certificate;

the first picture information and the second picture information are generated by the same picture template generation algorithm;

comparison on whether the first picture information and the second picture information are matched or mismatched is implemented by the certificate management application program; and when the first picture information and the second picture information are matched, the certificate management application program signs the electronic certificate with a private key in the smartphone of the user, and submits the relevant electronic certificate to a predetermined submitter.

2. A managing method for use of a certificate management application program installed on a smartphone of a user, wherein:

when there is a use request of the electronic certificate previously issued by an issuing agency and stored in the smartphone of the user, the certificate management application program allows using the electronic certificate only when it is confirmed that first picture template information registered at the time of issuance of the electronic certificate signed by a private key of the issuing agency and stored with the electronic certificate, and second picture template information obtained by the smartphone of the user at the time of use of the electronic certificate are mutually matched;

the first picture template information is stored within the certificate management application program and the second picture template information is an information generated by the certificate management application program based on the picture of the user obtained in real time by a camera of the smartphone of the user in time for use point of the electronic certificate;

the first picture template information is generated by a picture template generation algorithm of the issuing agency and the second picture template information is generated by a picture template generation algorithm, and the picture template generation algorithm of the issuing agency and the certificate management application program are same algorithm;

comparison on whether the first picture template information and the second picture template information are matched or mismatched is implemented by the certificate management application program; and when the first picture template information and the second picture template information are matched, the certificate management application program signs the electronic certificate with a private key in the smartphone of the user, and submits the relevant electronic certificate to a predetermined submitter.

3. The method of claim 1, wherein the first picture information or the first picture template information is biometrics template information generated by the issuing agency based on the biometrics information submitted to the issuing agency by the issuedable person that has requested the issuance of the electronic certificate.

4. The method of claim 1, wherein the first picture information or the first picture template information is biometrics template information extracted from photograph information distributed by the issuing agency to a user's terminal using the photograph information submitted to the issuing agency by the issuedable person that requested the issuance of the electronic certificate.

5. The method of claim 1, wherein the comparison on whether there is a consistent match between the first picture information and the second picture information, or the first picture template information and the second picture template information is implemented in time for an initially driven driving time of certificate management application or implemented in time for selection point of the electronic certificate by a relevant user.

6. The method of claim 2, wherein the first picture information or the first picture template information is biometrics template information generated by the issuing agency based on the biometrics information submitted to the issuing agency by the issuedable person that has requested the issuance of the electronic certificate.

7. The method of claim 2, wherein the first picture information or the first picture template information is biometrics template information extracted from photograph information distributed by the issuing agency to a user's terminal using the photograph information submitted to the issuing agency by the issuedable person that requested the issuance of the electronic certificate.

8. The method of claim 2, wherein the comparison on whether there is a consistent match between the first picture information and the second picture information, or the first picture template information and the second picture template information is implemented in time for an initially driven driving time of certificate management application or implemented in time for selection point of the electronic certificate by a relevant user.

* * * * *